United States Patent Office 3,067,132
Patented Dec. 4, 1962

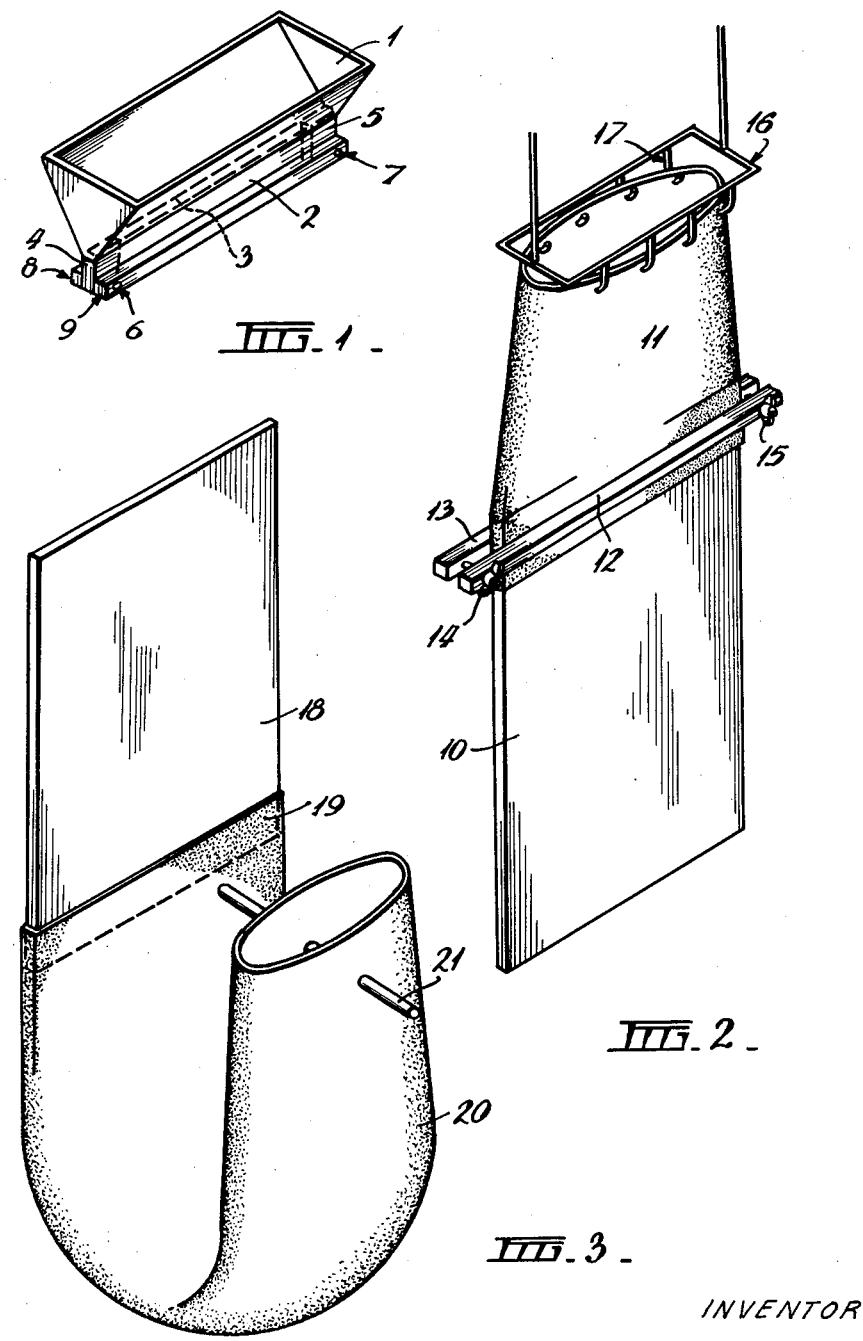

3,067,132
PAPER CHROMATOGRAPHIC EQUIPMENT
Dimiter Gunew, St. Albans, Melbourne, Victoria, Australia, assignor to Imperial Chemical Industries of Australia and New Zealand Limited, Melbourne, Australia, a corporation of Victoria, Australia
Filed July 1, 1960, Ser. No. 40,281
9 Claims. (Cl. 210—31)

This invention relates to novel paper chromatographic equipment, to a process of manufacture of said equipment and to the application of said equipment to processes of preparation of compounds and to methods of testing applicable to the improvement of manufacture.

Chromatography is a versatile and efficient method for the separation of mixtures of chemical compounds into the individual constituents for both analytical and preparative purposes. The wide application of this technique is apparent from over 3,700 scientific publications quoted in the bibliography by E. and M. Lederer (Chromatography, A Review of Principles and Applications, Elsevier Publishing Company, Amsterdam, London, New York, Princeton), which also presents a summary of the prior art of the present invention up to September 1956. It is well known that conventional paper chromatography provides a simple method of isolating many compounds which could not be readily separated previously, but the technique has generally been restricted to microgram quantities per sheet. This, so far, has somewhat limited the application of chromatography to quantitative methods of testing and has virtually precluded it from use as a preparative process. Column chromatography, on the other hand, is used for larger amounts, but cellulose powder columns, e.g., suffer from the disadvantage that they do not attain the same efficiency of separation as paper chromatography, since the zones of the various constituents of a mixture are not so well defined as on the more uniform texture of filter paper. In addition to this, the packing of the column is inconvenient, time consuming, and often suffers from faults such as "tracking."

Many attempts have been made to utilise the high separating efficiency particular to paper chromatography for separations on a larger scale. Thus, Mitchell and Haskins (Science 110, 278 (1949), developed the "chromatopile" method, in which a stack of circular filter paper sheets is clamped tightly together between stainless steel plates and sample and solvent are applied through a metal distributor. The disadvantages of this method are that the zones obtained in use are not straight and that their detection requires the removal of many sheets from the pile. Porter (Anal. Chem. 23, 412, 1951), modified this technique and clamped stacks of accurately cut paper strips to form a "Chromatopack." The "isolierpack" of Fischer and Behrens (Z. Physiol. Chem. 291, 14 (1952)), is a further improvement according to which a sample is applied to each strip of paper before the strips are accurately lined up for elution. This procedure is extremely time-consuming. Zechmeister (Science 113, 35 (1951)), uses a glass column packed with filter paper discs. One of the shortcomings of this method is, that, unless precision bore tube and precision punched papers are used, "channeling and gross irregularities in the flow of solutions become manifest". Danielsson (Arkiv Kemi 5, (14), 173 (1953)), and Hagdahl and Danielsson (Nature 174, 1062 (1954)), describe paper columns for preparative processes. In their process, filter paper is tightly wound around an inert cylindrical rod and pressed into an outer cylinder of polythene. Special machines are required to obtain close packing which is a prerequisite for sharp separatons and such packings, although commercially available, are very expensive. Brownell, Hamilton and Casselman (Anal. Chem. 29, 550 (1957)), introduced the heavy paper technique which allows the separation of larger quantities. According to their method, the sample is applied to Whatman seed test paper as a uniform streak. For elution the sheet of paper is hung on a stirrup of Whatman 3mm. paper, sewn to the sheet of seed test paper. Two similar strips sewn face to face along the same edge of the heavy paper serve as a wick to conduct solvent from the trough to the paper.

With this and with many of the other techniques considerable difficulty is experienced in applying a definite volume of sample as a streak of such uniformity that straight "fronts" are obtained. Furthermore, the stirrup and wick arrangement is cumbersone.

It is an object of this invention to provide a method and apparatus by which definite and ten to one hundred times larger masses of mixtures than in conventional paper chromatography can be applied to chromatographic paper in an extremely simple, single operation in such a manner as to yield the uniform distribution which is critical for the required clear definition of the separate zones. It is a further object of this invention to provide by the same apparatus means of applying eluent quantitatively in regular distribution. Furthermore, it is an object of this invention to provide simple and cheap paper chromatographic equipment which can be arranged in batteries and which can be used economically for preparation of commercial quantities of, for example, pharmaceutical substances. Another object of this invention is to provide a method of producing the paper chromatographic apparatus.

In achieving the above stated objects, the present invention provides a method of separating components of a sample comprising a mixture of solids or liquids dissolved in a solvent, characterised in that the sample is placed in a liquid-tight receptacle of which portion of the wall is formed by a sheet of chromatographic paper projecting outside the receptacle.

Preferably, the receptacle is made from thermoplastic material.

Conveniently, the receptacle may be a tube of thermoplastic material open at one end and closed at the other end by sealing of the thermoplastic material to the paper.

The present invention also provides paper chromatographic apparatus characterised by a liquid-tight receptacle of which portion of the wall is formed by a sheet of chromatographic paper projecting outside the receptacle.

Preferably the receptacle is a container having non-rigid walls, e.g. an open-topped polythene container, but a container having rigid walls may also be used. In either case, the container may be attached to the sheet of chromatographic paper by mechanical clamping means. If non-rigid, the container may be formed of thermoplastic material, e.g. polythene, polypropylene or rubber, and in this case the receptacle may consist of an open-ended tube of thermoplastic material flattened at one end and having the chromatographic paper sealed to the thermoplastic tube with one edge within the thermoplastic tube adjacent to said flattened end. Sealing may be effected by heat or by the application of adhesive between the tube and the paper.

The preferred method of producing the apparatus is characterized by the steps of forming in an open-topped container composed of thermoplastic material an aperture, placing one edge of a rectangular sheet of chromatographic paper within the aperture and sealing the thermoplastic to the paper, either by the application of heat or adhesive. The preferred chromatographic paper is seed test paper of thickness greater than 1 mm., for example, 3 mm. chromatographic paper made from non-cellulosic fibre, e.g. glass or nylon fibre, may also be used.

Examples of apparatus according to the present invention will now be described with reference to the accompanying drawings, in which each of the three figures is a perspective view of a different form of the apparatus.

The apparatus shown in FIG. 1 comprises a horizontally disposed stainless steel trough 1 in the form of a triangular prism with one side, the top side in use, removed. The two sides of the prism which in use constitute the sloping sides of the trough do not quite meet, but extend as a pair of closely spaced parallel vertical walls 2 and 3, each approximately one half inch in height. A long narrow opening is thus formed in the bottom of the trough. At either end, the space between the walls 2 and 3 is filled by blocks 4 and 5 of a resilient material, such as soft rubber, which extend the whole height of the walls 2 and 3. The walls 2 and 3 and the rubber sealing blocks 4 and 5 thus form a short vertical channel the cross section of which is a narrow rectangle the length of which is equal to the width of the chromatographic paper and the width of which is equal to or slightly greater than the thickness of the chromatographic paper. The top edge surface of the paper and the sealing blocks 4 and 5 thereby define the bottom wall portion of the apparatus.

The walls 2 and 3 can be compressed at their lower edges by screws 6 and 7 acting on stainless steel bars 8 and 9 to grip the sheet firmly and allow it to hang vertically downwards. This arrangement has the advantage, that the trough 1 can be left permanently in position, and fresh sheets of chromatographic paper can be rapidly attached for use.

The apparatus shown in FIG. 2 comprises a polythene tube 11 which is stretched over the end of a chromatographic sheet 10 to cover the sheet for a distance of approximately one inch. The tube 11 is pressed against the sheet 10 between two brass bars 12 and 13 which can be forced together by wingnuts 14 and 15. The apparatus is supported with the sheet 10 hanging vertically by the wire frame 16 to which are attached hooks 17 passing through perforations near the upper end of the tube 11.

In a preferred embodiment of my invention, the attachment of a thermoplastic receptacle, such as a polythene tube, to the chromatographic sheet, instead of by friction as in FIG. 2 may be effected by heat sealing. In this case the bars 12 and 13 with wingnuts 14 and 15 of FIG. 2 are omitted; instead, the tube 11 is stretched sidewise over the chromatographic paper 10, which is inserted into the tube for a distance between one-eighth of an inch and one inch. The polythene is then heat-sealed to the paper, using conventional heat-sealing methods, to provide a liquid-tight joint. When sealing polythene film of 0.005 inch in thickness to the paper by the use of the strip heating equipment manufactured by A. H. Bland (Engineers) Ltd., of Great Britain, and sold under the registered trademark "Pyramid," the polythene was exposed to heat for 10 seconds at a machine setting of 95. Such a seal is shown at 19 in FIG. 3.

Yet another method of attachment of the plastic receptacle to the chromatographic paper, instead of by friction or heat sealing, as described above, is by the application of adhesive between the container and the sheet. The adhesive must, of course, be insoluble in and inert to the solvents and compounds being used in the chromatographic operation. A further alternative method of attachment is the stitching of the sheet to the container, the stitches being sealed by the application of heat or adhesive.

The apparatus shown in FIG. 2, with any of the described methods of attaching the plastic tube to the chromatographic paper, may also be mounted as shown in FIG. 3 to permit elution by what is known in the art as ascending technique. In this application of the apparatus the chromatographic paper 18, supported in a vertical plane by means not shown, is inverted by 180°, the seal 19 to the polythene tube 20 being at the bottom edge of the paper. The open end of the tube 20 is raised through approximately 180 degrees and is supported in raised position by the horizontal rod 21 passing through the tube near its open end.

In applying the method of the present invention to the apparatus illustrated in all of these examples, the sample to be separated into its components is placed in the container, i.e. the polythene tube 11 or 20 or the trough 1, and allowed to be absorbed by the chromatographic paper. Solvent is then placed in the container for elution, i.e. the chromatographic separation, as described in prior art. The zones into which the individual components separate may be cut apart and extracted from the paper cuts. Alternatively, as known in the art, excess of solvent may be used to allow dripping of the solution from a suitably cut bottom tip of the paper and different fractions are collected consecutively at different times. If the sample is sufficiently dilute, it may not be necessary to add separate quantities of solvent.

Once the boundaries of the zones have been determined by a preliminary experiment, the same distribution of zones will be reproduced subsequently under the same conditions, so that this method can be used for the commercial extraction of desired components, for example pharmaceuticals, by the simultaneous operation of a series of pieces of apparatus.

In using a series of apparatus units of the above described construction for the preparative isolation of commercial quantities of compounds, mixtures to be chromatographed and eluents may be supplied automatically to the units from known proportioning means, e.g. weir boxes, automatic pipettes or proportioning pumps.

*Example*

One hundred units of the construction shown in FIG. 2, having a paper sheet 15 inches wide, 12 inches long and 3 mm. thick, were spaced equidistantly around and supported from the periphery of a circular horizontal disc so that the sheets were suspended in vertical planes converging radially on the axis of the disc. The disc was rotated intermittently in steps of such an angle that each unit was replaced in position by the nearest following unit. A stationary automatic measuring pipette was located adjacent to the periphery of the disc and was arranged to deliver a predetermine quantity of the mixture to be chromatographed into the tube 11 as each unit reached the first of the positions of rest around its path of travel. At a later position of rest, a second automatic measuring pipette was arranged to deliver a predetermined quantity of eluent into the tube 11. The chromatogram was then permitted to develop during the completion of the travel of the rotary disc and the zones were separated by cutting apart.

Alternatively predetermined excess of solvent was added from the second measuring pipette and individual fractions were permitted to drip from the suitably cut bottom tip of the chromatographic papers. Funnels or receptacles of convenient shape were positioned along the periphery of the circular disc under the chromatograms in such a way that the whole of the solution, containing a desired fraction, during the path of each chromatogram over one particular funnel or receptacle, was collected into this one receptacle.

In this manner 220 g. of diphenylamine were prepared in a chemically pure state per one operating cycle (revolution) of the disc which occupied 6 hours.

From the foregoing description of the various embodiments of this invention, it is evident that the objects of this invention, together with many practical advantages, are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

I claim:

1. Paper chromatographic apparatus comprising: a liquid-tight receptacle, a sheet of chromatographic paper having a generally straight, horizontal edge joined to and forming a major portion of the bottom wall portion of said receptacle, said paper projecting outside thereof.

2. Paper chromatographic apparatus as claimed in claim 1, wherein said receptacle is formed of thermoplastic material.

3. Paper chromatographic apparatus as claimed in claim 1, wherein said receptacle is formed of material selected from the group consisting of polythene, polypropylene and rubber.

4. Paper chromatographic apparatus as claimed in claim 1, wherein said receptacle is a container having rigid walls.

5. Paper chromatographic apparatus as claimed in claim 1 including mechanical clamping means joining said container to said paper sheet.

6. Paper chromatographic apparatus as defined in claim 1, wherein said chromatographic paper is composed of non-cellulosic fibre.

7. Paper chromatographic apparatus as claimed in claim 1, wherein said receptacle includes an open-ended tube of thermoplastic material flattened at one end and the chromatographic paper is sealed to the thermoplastic tube with one edge within the thermoplastic tube adjacent to said flattened end.

8. Paper chromatographic apparatus as claimed in claim 7, including a heat sealed joint between said paper and said tube.

9. Paper chromatographic apparatus as claimed in claim 7, including adhesive means for joining said tube to said paper.

References Cited in the file of this patent

UNITED STATES PATENTS

| | | |
|---|---|---|
| 2,555,487 | Haugaard et al. | June 5, 1951 |
| 2,744,041 | Balchen | May 1, 1956 |

OTHER REFERENCES

Block et al.: "Paper Chromatography and Paper Electrophoresis," Academic Press, New York, 1958, pages 25 and 26.